US012778145B2

(12) United States Patent
Campbell et al.

(10) Patent No.: US 12,778,145 B2
(45) Date of Patent: Nov. 3, 2026

(54) APPARATUS AND METHOD WITH INTEGRATED PROCESS CHECKWEIGHER FOR COMMERCIAL BREAD PRODUCT MANUFACTURE

(71) Applicant: AMF Bakery Systems, Richmond, VA (US)

(72) Inventors: Bruce Campbell, Richmond, VA (US); William J. Schreier, Jr., Richmond, VA (US); Tom Pearce, Richmond, VA (US)

(73) Assignee: AMF BAKERY SYSTEMS, INC., Richmond, VA (US)

( * ) Notice: Subject to any disclaimer, the term of this patent is extended or adjusted under 35 U.S.C. 154(b) by 446 days.

(21) Appl. No.: 18/244,608

(22) Filed: Sep. 11, 2023

(65) Prior Publication Data

US 2024/0081348 A1 Mar. 14, 2024

Related U.S. Application Data

(60) Provisional application No. 63/405,671, filed on Sep. 12, 2022.

(51) Int. Cl.
*A21C 13/02* (2006.01)
*A21C 5/00* (2006.01)

(52) U.S. Cl.
CPC ................ *A21C 13/02* (2013.01); *A21C 5/00* (2013.01)

(58) Field of Classification Search
CPC ........... A21C 13/02; A21C 5/00; A21C 9/081; A21C 9/083
See application file for complete search history.

(56) References Cited

U.S. PATENT DOCUMENTS

| | | | | | |
|---|---|---|---|---|---|
| 4,420,051 | A * | 12/1983 | Furuta | G01G 19/393 | 177/52 |
| 6,407,346 | B1 * | 6/2002 | Baker | G01G 15/00 | 177/83 |
| 6,441,321 | B1 * | 8/2002 | Hebenstreit | G01G 11/003 | 426/496 |
| 2016/0135471 | A1 * | 5/2016 | Hebenstreit | G01G 11/003 | 425/140 |
| 2025/0049043 | A1 * | 2/2025 | Hebenstreit | A21C 13/02 | |
| 2026/0026511 | A1 * | 1/2026 | Hebenstreit | A21C 5/00 | |

* cited by examiner

*Primary Examiner* — Natalie Huls
(74) *Attorney, Agent, or Firm* — THOMAS | HORSTEMEYER, LLP

(57) ABSTRACT

Disclosed are embodiments of a dough proofer for a commercial bakery that can receive dough pieces from a dough divider onto trays. Each tray has cups that hold dough pieces. The trays are moved through the proofer by a conveyor system. The proofer has a checkweigher. The checkweigher also uses the same conveyor system and has (1) a tray tipper that tips a tray of dough pieces to make the dough pieces fall out of the tray; (2) a row of gates under the tray to receive and hold the dough pieces and release the dough pieces so that they fall back into their original cups and tray; (3) a row of load cells associated with gates that produces weight data indicative of dough piece weights; and (4) a controller that controls the divider based upon the weight data so that the dough pieces exhibit a substantially uniform target weight.

20 Claims, 9 Drawing Sheets

APPARATUS AND METHOD WITH INTEGRATED PROCESS CHECKWEIGHER FOR COMMERCIAL BREAD PRODUCT MANUFACTURE

CLAIM OF PRIORITY

This application claims priority to and the benefit of provisional application No. 63/405,671 filed Sep. 12, 2022, which is incorporated herein by reference.

FIELD OF THE INVENTION

The present disclosure generally relates to dough processing equipment for an industrial bakery for the commercial production of bread products, for example but not limited to, buns, muffins, rolls, etc., and more particularly, to an apparatus and method for weighing and adjusting the weight of dough pieces passing through a dough proofer at high production rates.

BACKGROUND

Commercial dough production often involves production of large quantities of dough which are continuously divided into pieces using various types of dividers. After the dough pieces, or balls, are divided, they are often rounded in shape and received into a dough proofing system that allows the dough pieces to rest before the dough pieces are molded and placed in pans for baking or further processing.

The dividers are generally set up to pre-established set points, then monitored during production runs for accuracy. During the production, an operator typically samples dough pieces, for example, every 15 minutes, to ensure weight accuracy. If the weights are off target, then the operator will make a scaling adjustment to the divider. This process is obviously labor intensive and requires a certain amount of logic and decision making to the process.

Due to the difficulty in maintaining a constant weight of divided dough pieces at high production rates, there was and still is a need for a weighing apparatus to continuously monitor and control the weight of divided dough pieces at high production rates without human intervention. Preferably, such a system would minimize the variations in the weight of dough pieces from a desired weight by automatically calculating and implementing precise adjustments to the controller of the dough feeding mechanism.

U.S. Pat. No. 10,098,355, which is incorporated by reference herein and which has an inventor that is also one in connection with the present disclosure, describes such a weighing apparatus that automatically weighs the dough pieces and uses the data to automatically adjust the scaling parameters of the divider. Although the weighing apparatus is meritorious to an extent and generally works well, however, unfortunately, it uses a very complex set of belts, slides, load cells, etc., and undesirably creates a large amount of flour dust in the area. Additionally, the weighing apparatus is a separate machine, which requires more valuable space.

SUMMARY OF THE INVENTION

Disclosed are various embodiments of an apparatus and method for dividing a continuous flow of dough into a plurality of pieces, each piece having a substantially uniform preselected target weight.

One embodiment, among others, can be summarized as follows. The apparatus has a divider that receives the continuous flow of dough and that divides the dough into pieces sized in proportion to an operating rate that is controlled by electrical operating rate control signals. A proofer downstream from the dough divider receives and transports the dough pieces from the dough divider onto trays at an average speed equal to the divider, each tray having a plurality of cups that hold respective dough pieces, the trays being movable in succession through the intermediate proofer via a conveyor means. A checkweigher is integrated with the proofer that receives and transports the dough pieces via the conveyor means, the checkweigher having: (a) tray tipper designed to tip a selected tray of dough pieces so that the dough pieces of the selected tray fall out of the tray; (b) a plurality of gates situated under the selected tray, each gate designed to receive a respective dough piece, to hold the dough piece for predetermined time period, and to release the dough piece after the predetermined time period so the dough piece falls into the cup from which the dough piece originally resided in the selected tray; and (c) a plurality of load cells associated with respective gates, each load cell configured to produce weight data indicative of a weight of the respective dough piece. A controller in electrical communication with the dough divider and the load cells is designed to receive the weight data from the load cells and to adjust the operating rate control signals that are communicated to the dough divider.

Another embodiment, among others, is an apparatus for dividing a continuous flow of dough into a plurality of pieces, each piece having a substantially uniform preselected target weight. The apparatus includes at a high conceptual level the following features: (a) means for receiving a continuous flow of dough and dividing the dough into pieces sized in proportion to an operating rate; (b) means for placing the dough pieces in trays, each tray having a plurality of cups that hold respective dough pieces; (c) means for moving the trays in succession along a circuitous path; (d) means for tipping a selected tray of dough pieces so that the dough pieces of the selected tray fall out of the tray; (e) means for receiving the dough pieces in respective gates, holding the dough pieces in the gates, measuring weights associated with each dough piece while being held, and releasing the dough pieces so the dough pieces fall into the cups from which the dough pieces originally resided in the selected tray; and (f) means for adjusting the operating rate based upon the weights.

Still another embodiment, among others, is a proofer that can receive dough pieces from a dough divider onto trays at an average speed equal to the dough divider. Each tray has a plurality of cups that hold respective dough pieces. The trays are movable in succession through the intermediate proofer via a conveyor system. In this embodiment, the proofer has a checkweigher associated with the proofer that receives and transports the dough pieces via the conveyor system of the proofer. The checkweigher has (1) tray tipper designed to tip a selected tray of dough pieces so that the dough pieces of the selected tray fall out of the tray; (2) a plurality of gates situated under the selected tray, each gate designed to receive a respective dough piece, to hold the dough piece for predetermined time period, and to release the dough piece after the predetermined time period so the dough piece falls into the cup from which the dough piece originally resided in the selected tray; (3) a plurality of load cells associated with respective gates, each load cell configured to produce weight data indicative of a weight of the respective dough piece; and (4) a controller capable of controlling the dough divider based upon the weight data so that the dough pieces exhibit a substantially uniform preselected target weight.

Yet another embodiment, among others, is a method for dividing a continuous flow of dough into a plurality of pieces, each piece having a substantially uniform preselected target weight. The method can be broadly summarized by the following steps: (a) receiving a continuous flow of dough and dividing the dough into pieces sized in proportion to an operating rate; (b) placing the dough pieces in trays, each tray having a plurality of cups that hold respective dough pieces; (c) moving the trays in succession along a circuitous path; (d) tipping a selected tray of dough pieces so that the dough pieces of the selected tray fall out of the tray; (e) receiving the dough pieces in respective gates, holding the dough pieces in the gates, measuring weights associated with each dough piece while being held, and releasing the dough pieces so the dough pieces fall into the cups from which the dough pieces originally resided in the selected tray; and (f) adjusting the operating rate based upon the weights.

Other embodiments, apparatus, methods, features, and advantages of the present invention will be apparent to one with skill in the art upon examination of the following drawings and detailed description. It is intended that all of the foregoing be included within this disclosure, be within the scope of the present disclosure, and be protected by the accompanying claims.

BRIEF DESCRIPTION OF THE DRAWINGS

Many aspects of the present disclosure can be better understood with reference to the following drawings. Like reference numerals designate corresponding parts throughout the several views. The components in the drawings are not necessarily to scale, emphasis instead being placed upon clearly illustrating the principles of the present disclosure.

DETAILED DESCRIPTION OF THE PREFERRED EMBODIMENT(S)

Figure 1:
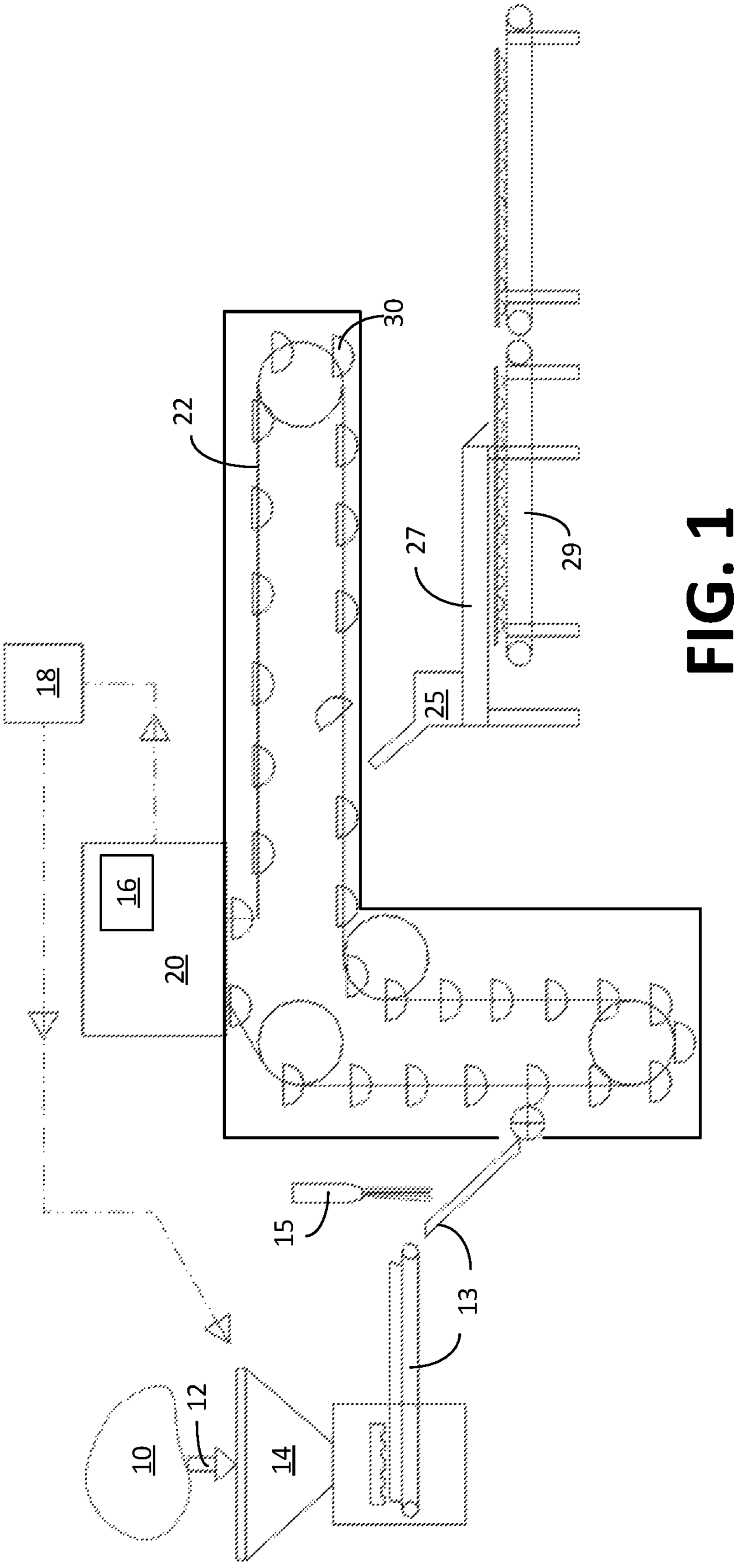
FIG. 1 is a schematic diagram of an embodiment of the present disclosure with a typical arrangement of dough processing equipment in a commercial bakery for buns, rolls, or muffins.

FIG. 1 is a schematic diagram of a nonlimiting example of an embodiment of the present disclosure with a typical arrangement of dough processing equipment in a commercial bakery for bread products, for example but not limited to, buns, muffins, rolls, etc. As shown in FIG. 1, this embodiment includes a dough production mechanism 10 for producing dough, a dough feed mechanism 12, a dough divider 14, an intermediate proofer 20 having an integrated process checkweigher 16, and a weight signal controller 18 to calculate and transmit appropriate control signals to the dough feed mechanism 12. A conveyor system 22, having one or more conveyors and associated sprockets, rollers, etc., is designed to transport dough pieces 23, or balls, from the divider 14 to the intermediate proofer 20 having the integrated checkweigher 24, which after weighing dough pieces, reinserts the dough pieces back into their respective positions on the original tray 30 for further processing. Next, the dough pieces are fed to a sheeter 25 designed to place the bread products on sheets, then to a molder 27 designed to mold the bread products into specific configurations, such as buns, muffins, rolls, etc., and finally to a pan indexing conveyor 30, where the bread products are fed into baking pans.

The dough divider 14 receives the continuous flow of dough and divides the dough into pieces 23 sized in proportion to an operating rate that is controlled by an electrical operating rate control signal. FIG. 1 illustrates a typical commercially available dough divider 14 having one or more cutting blades 15 that is capable of cutting dough pieces 23 at very high production rates. Once portioned, the dough pieces fall to a rounder conveyor 13 that shapes the dough pieces into spheres and delivers them to a flouring area 15, where the dough pieces are loaded into the proofer trays 30 in the intermediate proofer 20. The dough pieces are allowed to rest as they are conveyed through the intermediate proofer 20.

Figure 2:
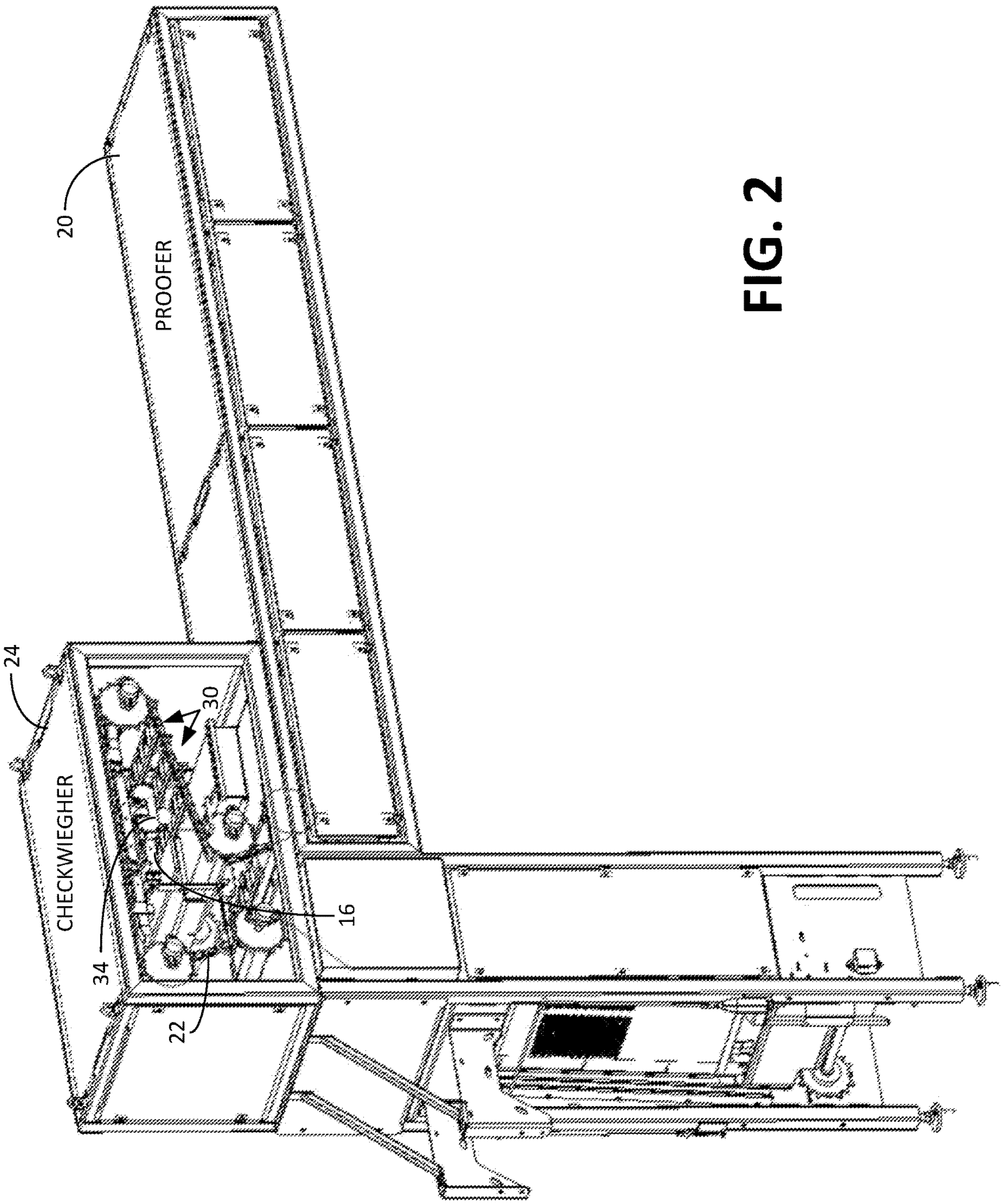
FIG. 2 is a perspective view of the intermediate proofer and the integrated process checkweigher of FIG. 1.
Figure 3:
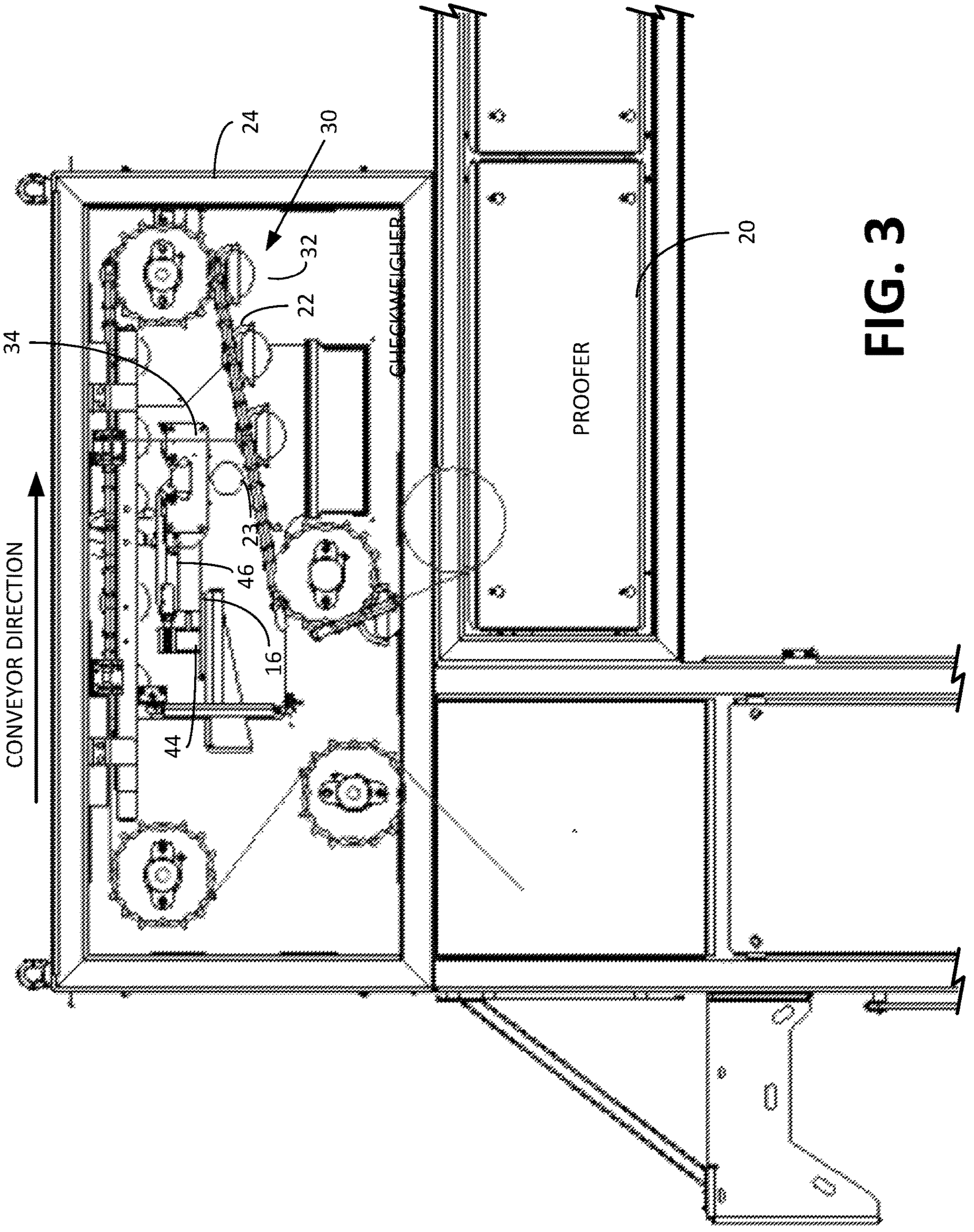
FIG. 3 is an enlarged side view of the integrated process checkweigher of FIG. 1.
Figure 4:
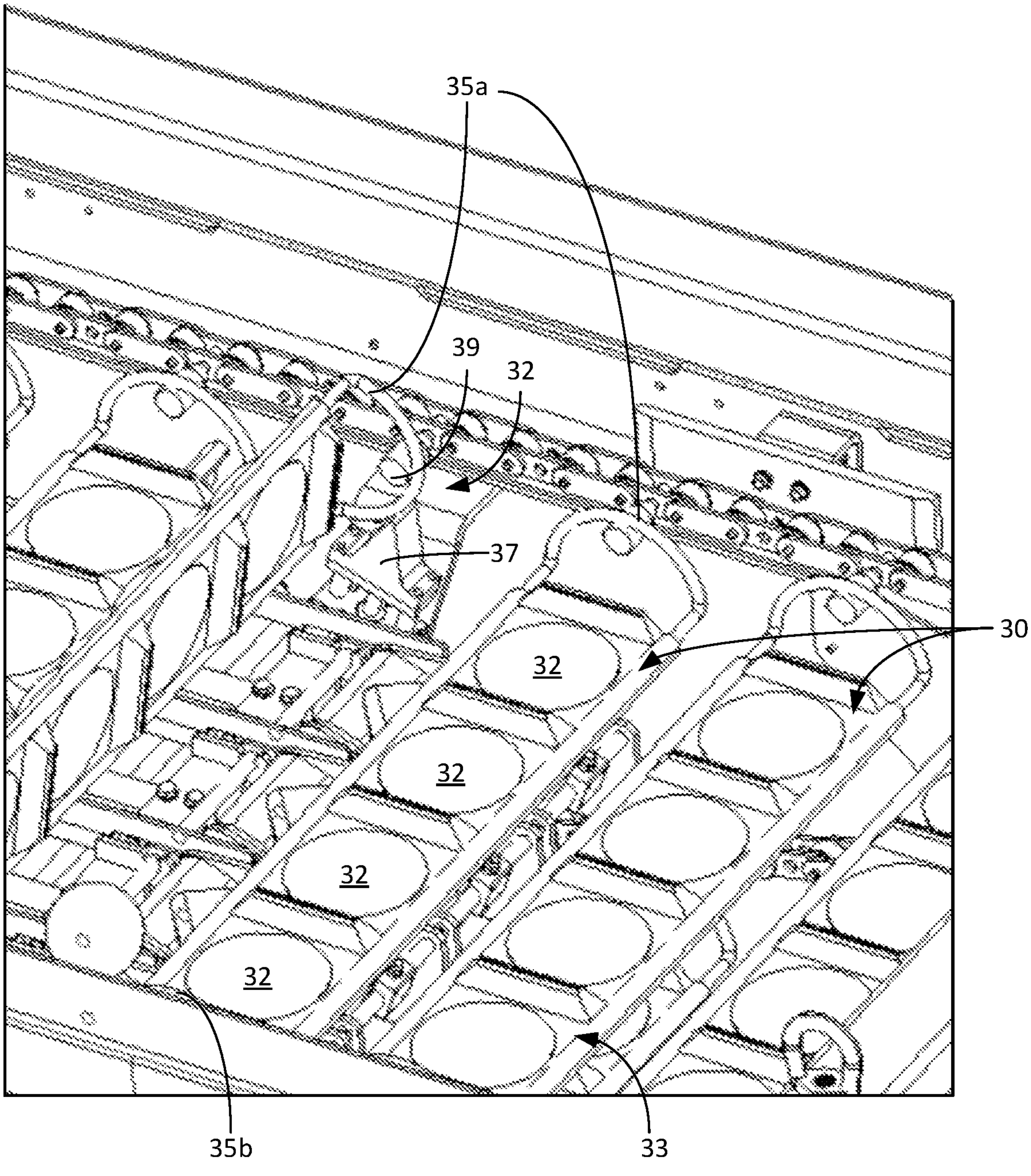
FIG. 4 is a perspective view of a series of gates that are associated with respective load cells that measure the weights of respective dough pieces.
Figure 5:
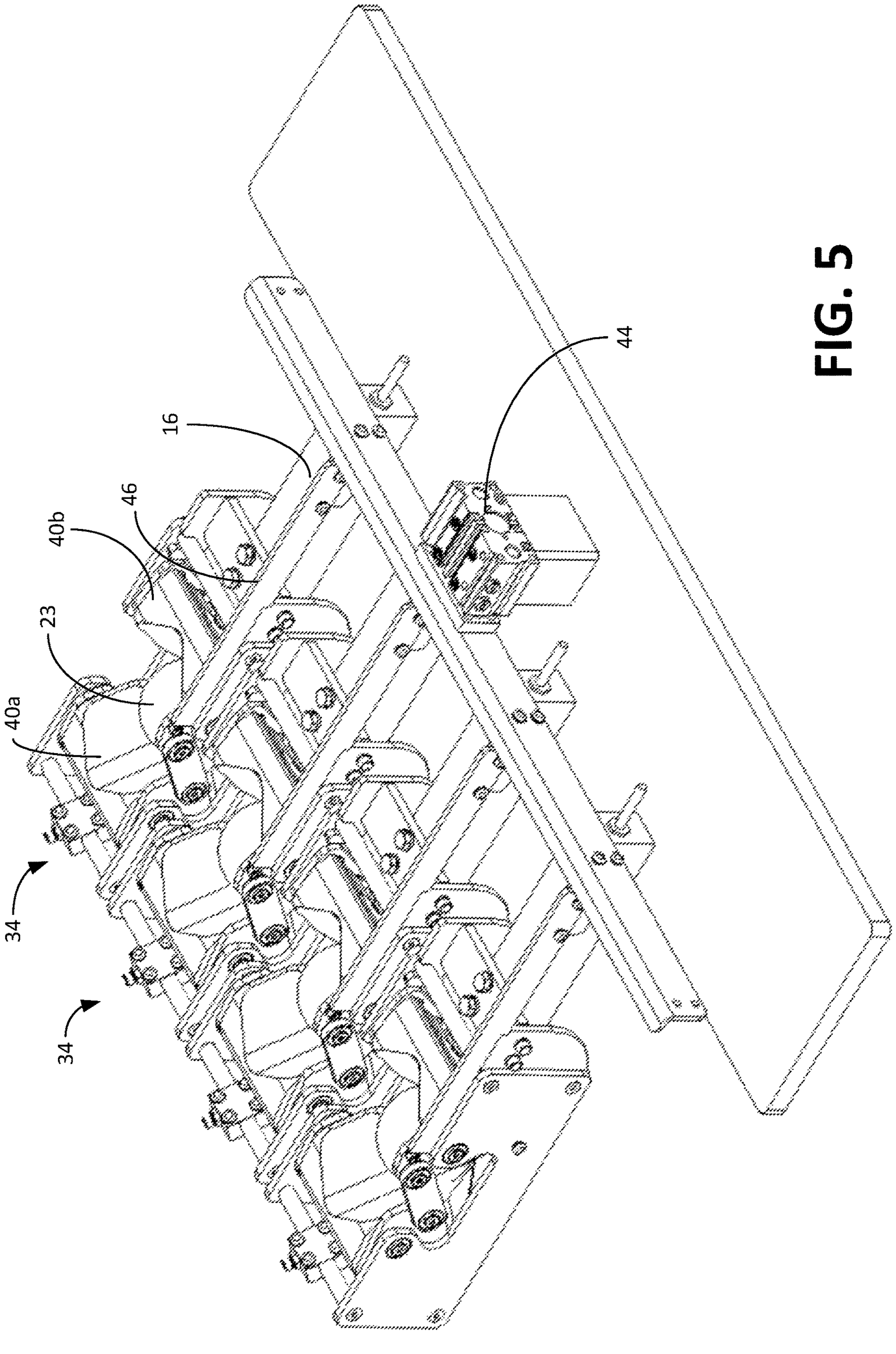
FIG. 5 is an enlarged perspective view of a single gate of FIG. 4.
Figure 6:
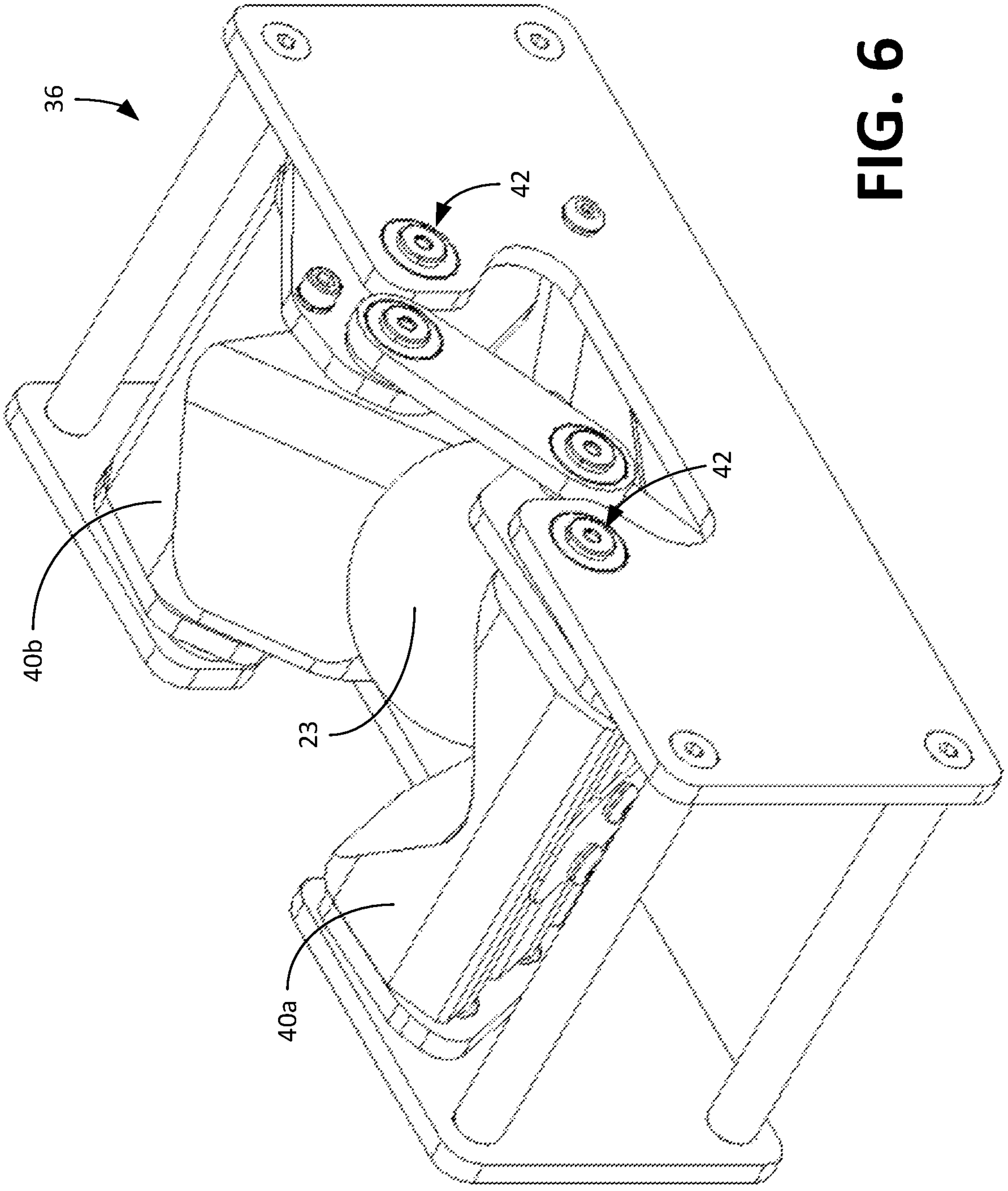
FIG. 6 is a perspective view of a tray tripper associated with the integrated process checkweigher.

An embodiment of the intermediate proofer 20 with the integrated process checkweigher 24 is shown in FIGS. 2 and 3. The intermediate proofer 20 is situated downstream from the dough divider 14 and receives and transports the dough pieces 23 from the dough divider 14 onto proofer trays 30, as shown in FIG. 4, at an average speed equal to the divider 14. Each tray 30 has a plurality of cups 32, preferably four in number in this example, that hold respective dough pieces 23. The trays 30 are moved in succession through the intermediate proofer 20 via the conveyor system 22.

With reference to FIG. 3, the checkweigher 24 that is integrated within the proofer 20 is designed to receive and transport the dough pieces 23 via the conveyor system 22. In the preferred embodiment, the checkweigher has the tray tipper 26 designed to tip a selected tray 30 of dough pieces 23 so that the dough pieces 23 of the selected tray 30 fall out of the tray 30. More specifically, as illustrated in FIG. 4, each tray 30 has a frame 33 with an elongated body extending between first and second ends. A row of cups 23 is supported by the frame 33 between the first and second ends. The concave surface of each cup faces upwardly and is designed to hold a respective dough piece. 23. First and second semicircular-shaped end bars 35*a*, 35*b* extend upwardly from the first and second ends, respectively. Each end bar 35*a*, 35*b* is pivotally connected to the conveyor system 22 via rollers 39 so that the frame 33 typically remains in a posture where the cups have their respective concave surfaces facing upwardly as the tray 30 is moved along a circuitous path by the conveyor system 22. In the preferred embodiment, the conveyor system comprises at least one conveyor having first and second chains connected to the first and second ends of the frame 33 of the tray 30 and that together move the tray 30 in the same direction. An actuator 37, which is controlled by the controller 18, associated with the checkweigher 24 is selectively moved in order to tip and un-tip the selected tray 30 by pressing against and along the outer edge of one of the semicircular end bars 35*a*, 35*b*. Preferably, about every $10^{th}$ tray is selected for the weighing process.

A plurality of weight bucket gates 34, as shown in FIG. 4, are situated under the selected tray 30. Each gate 34 is designed to receive a respective dough piece 23, to hold the dough piece 23 for a predetermined time period, and to release the dough piece 23 after the predetermined time period so the dough piece 23 falls into the cup 30 from which the dough piece 23 originally resided in the selected tray 30.

More specifically, each weight bucket gate 34 has a housing 36 defining a channel 38 extending through the housing 36 from a top side to a bottom side and through which the respective dough piece 23 travels. Each gate 34 further includes opposing first and second grasping members 40*a*, 40*b* situated adjacent to the channel 38. Each grasping member 40*a*, 40*b* has a body with upper and lower ends. The upper end is connected to the housing 36 via at least one hinge 42. In the preferred embodiment, there are two hinges 42 at the upper end of each grasping member 40*a*, 40*b*. The lower end is capable of pivoting inwardly into the open channel 38 to an inward position to thereby partially close, or obstruct, the channel 38 in order to catch and temporarily hold the respective dough piece 23. The lower end is also capable of pivoting outwardly from the inward position to an outward position to thereby re-open the channel 38 in order to release the respective dough piece 23 that is being held.

An actuator 44, preferably, a commercially available linear actuator, is connected to the grasping members 40*a*, 40*b* via solenoid-controlled mechanical linkage 46, or actuator arm, so that the actuator 44 can control movement of the lower ends of the grasping members 40*a*, 40*b* between the inward and outward positions. The controller 18 is in electrical communication with and controls the actuator 44.

As shown in FIGS. 2 and 3, the weighing mechanism 16 preferably includes a plurality of load cells 16, or weight cells, are associated with respective gates 34. Each load cell 34 is configured to produce an electrical weight signal indicative of a weight of the respective dough piece 23. In the preferred embodiment, each load cell 16 is a high precision electromagnetic force coil weigh cell, which are commercially available.

The conveyor system 22 transports the trays 30 in a circuitous path over the gates 34 where the pieces 23 are tipped and fall downwardly to the gates 34 and then under the gates 34 where the pieces 23 are captured after being weighed. Because of the circuitous path, the pieces 23 can be dropped back into the original tray 30 and cups 32 from which they came. The circuitous path is made possible by various chain sprockets associated with the chain conveyor system 22.

The controller 18 in electrical communication with the dough divider 14 and the load cells 16. The controller 18 is designed to receive the weight data signals from the load cells 16 and to adjust the operating rate control signal that is communicated to the dough divider. In the preferred embodiment, the controller 18 is a computer having a processor that uses a software-based algorithm (FIG. 8) to optimize cutting performance. In the algorithm, the weights of samples are placed into an array of selectable size. These sample weights enter and exit the array first-in first-out order. The standard deviation of the data in the array is recalculated when each, new sample weight is processed.

Figure 7:
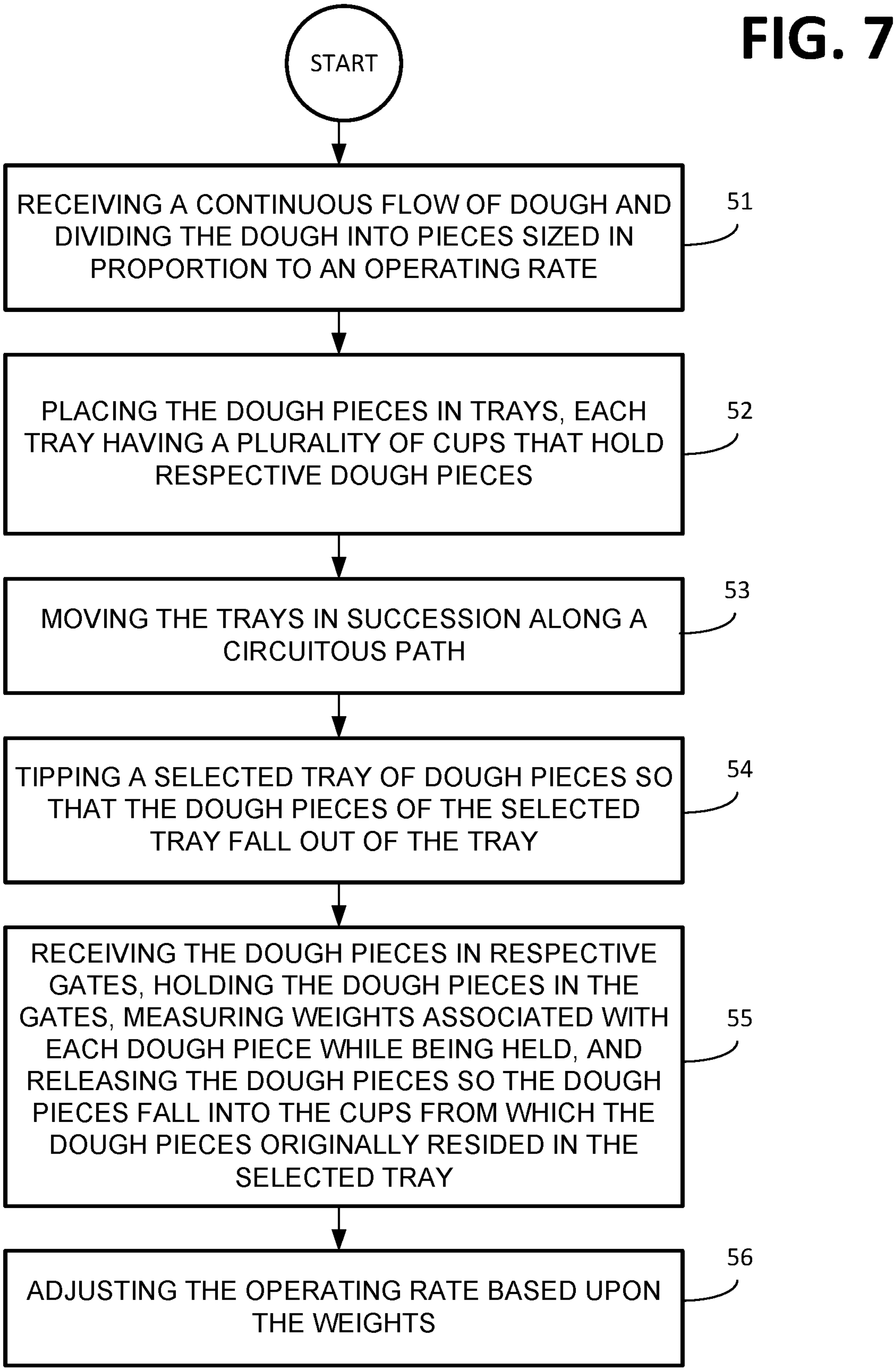
FIG. 7 is a flow chart illustrating a first embodiment of a method in accordance with the present disclosure.

FIG. 7 is a flow chart illustrating an embodiment, among others, of a method 50 in accordance with the present disclosure for dividing a continuous flow of dough into a plurality of pieces 23, each piece 23 having a substantially uniform preselected target weight. The method 50 can be summarized by the following steps. First, at step 51, a continuous flow of dough is received and divided into pieces 23 sized in proportion to an operating rate. At step 52, the dough pieces 23 are placed in trays with each tray having a plurality of cups that hold respective dough pieces 23. Next, at step 53, the trays are moved in succession along a circuitous path. At step 54, a selected tray 30 is tipped so that the dough pieces 23 of the selected tray 30 fall out of the tray 30. At step 55, the dough pieces 23 are received in respective gates 34, are held in the gates 34, the weights associated with each dough piece 23 is weighed while being held, and then the dough pieces 23 are released so the dough pieces 23 fall into the cups 32 from which the dough pieces 23 originally resided in the selected tray 30. Finally, at step 56, the operating rate is adjusted based upon the weights.

Figure 8A:
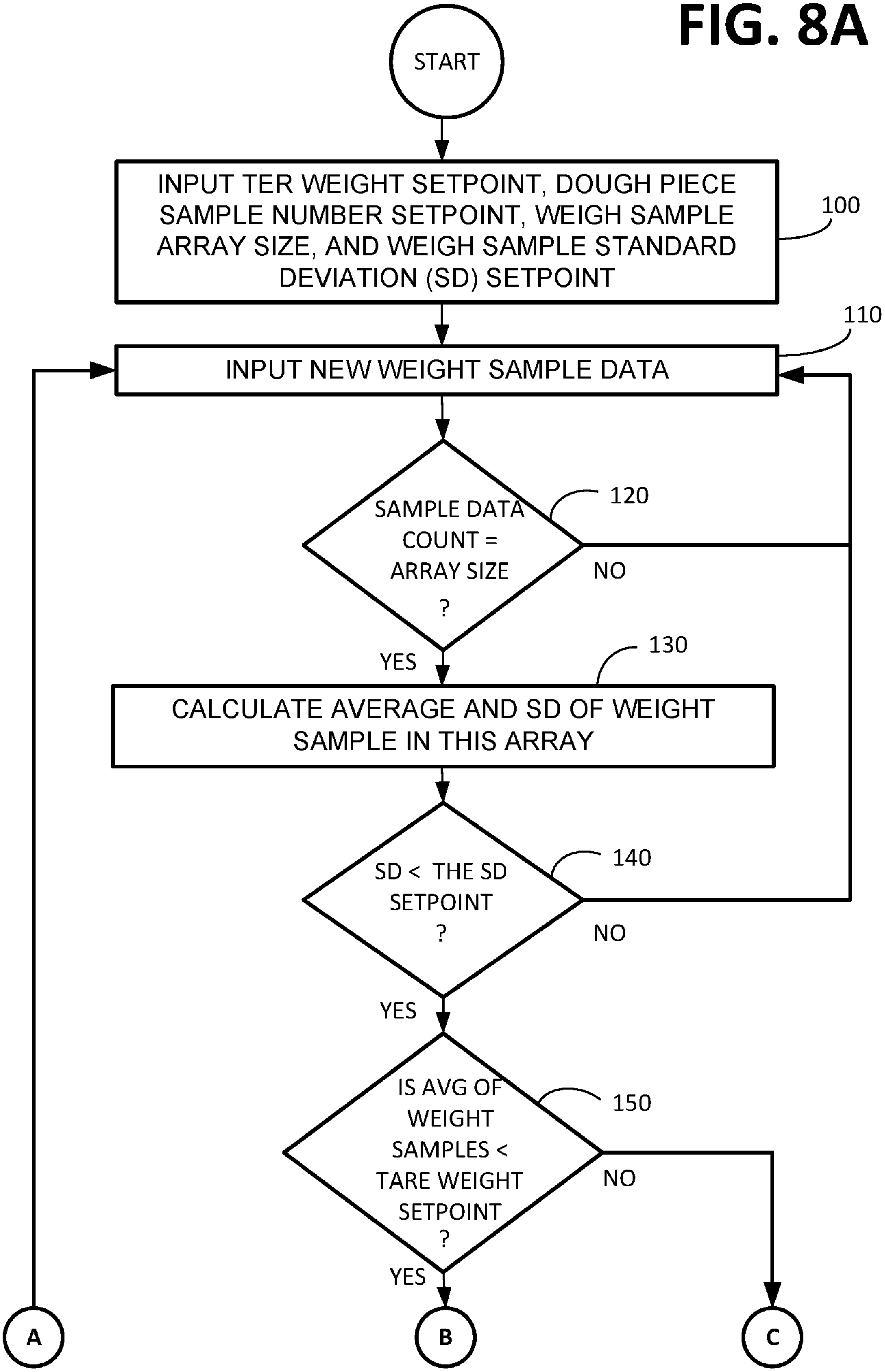
FIG. 8 (FIG. 8A combined with FIG. 8B) is a flow chart illustrating a second embodiment of a method in accordance with the present disclosure.
Figure 8B:
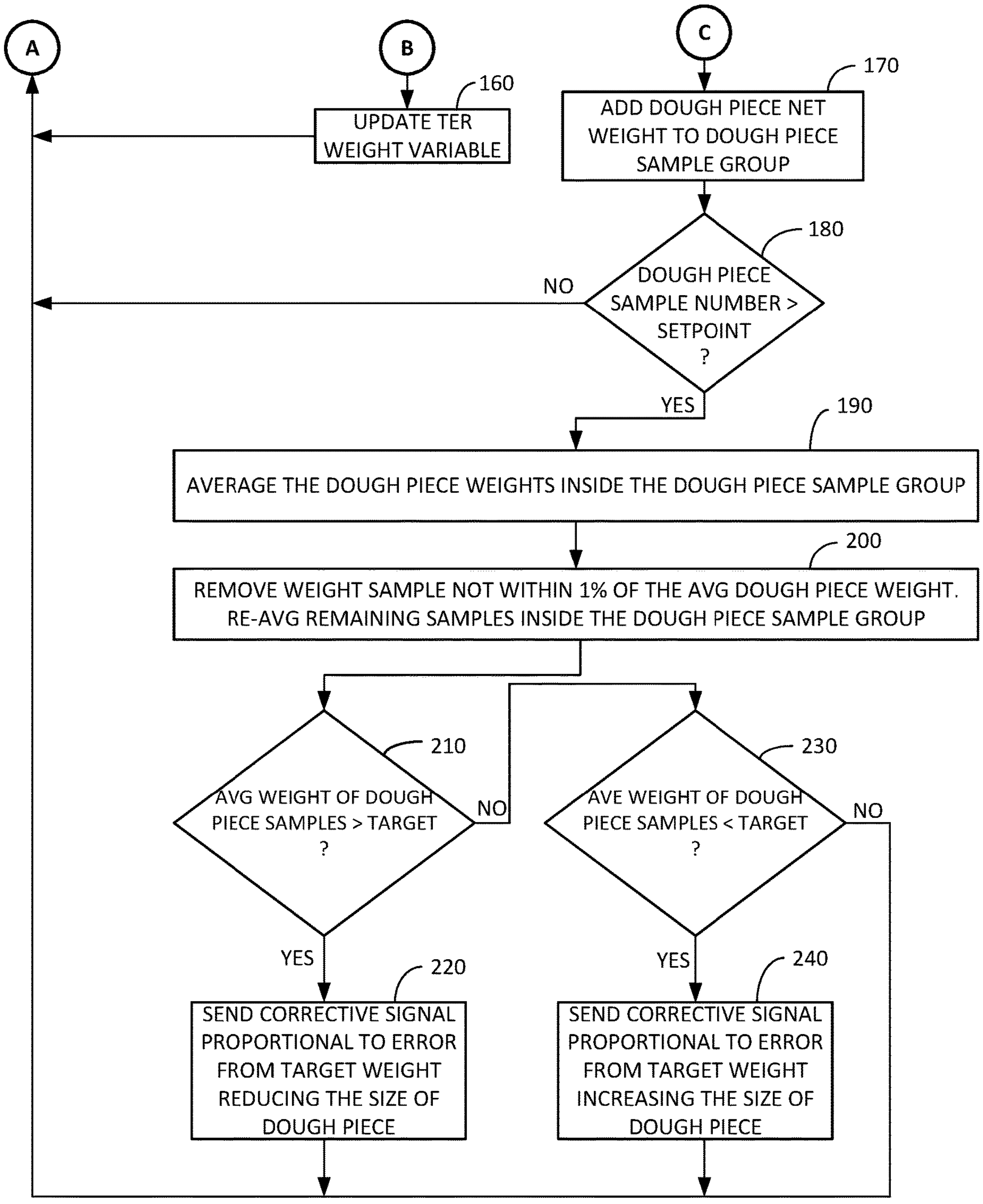

FIG. 8 (FIG. 8A combined with FIG. 8B) is a flow chart illustrating another embodiment, among others, of a method associated with the software-based algorithm. As shown in FIG. 8, at step 100, the tare setpoint, desired array size and the predetermined standard deviation are input.

At step 120, if the new weight sample along with the prior weight samples input are sufficient in number to complete the array, the process proceeds to step 130. If the sample count data points in the array is not sufficient to complete the array, the process reverts to step 110 for input of additional weight sample data.

If the array was previously full, as each new weight sample data is added, the oldest prior weight sample data entry is deleted from the array.

At step 130, the average and standard deviation of the data in the array are calculated. At step 140, if the standard deviation is less than the predetermined standard deviation limit, the process continues to step 150. If the standard deviation exceeds the predetermined limit, the process reverts to step 110 for the input of additional weight sample data until the data in the array is sufficiently consistent to meet the standard deviation limitation.

At step 150, the average of the array weight samples is compared to the predetermined tare setpoint. If the average weight is less than the tare setpoint, the array comprises weight sample data from the unloaded loadcell, and is used to update the tare weight variable at step 160. This updated tare weight variable is subsequently used to calculate the net weight of the dough pieces 23. Upon completion of this updating of the tare weight variable, the process reverts to step 110 for the input of additional weight sample data.

Alternatively, if the average weight of the array data is greater than the tare set point, the data represents loadcell indications taken while a dough piece 23 is at rest on the load cell, and the tare weight variable is subtracted from this average loadcell reading to calculate the dough piece net weight at step 170. This dough net weight data is also included in the dough piece sample set at step 170.

The dough piece sample group is of a user selected size, normally comprising a group of 8 to 12 dough piece weights. This group of weights is averaged and compared to the desired dough piece weight to determine if a corrective signal is required.

As shown in step 180, if the number of dough piece sample data points is less than the predetermined number of dough piece samples in the group, the process reverts back to step 110 for the input of further data. Alternatively, if the dough piece sample group size is sufficient, at step 190 the average of the dough piece weight data in the dough sample group is calculated.

Various methods of filtering the data in the dough sample group may be used. For example, as illustrated in step 200, any weight sample data varying more than 1% from the average dough piece weight can be eliminated from the dough sample group, and then the average dough piece weight to is recalculated using the more restrictive sample group data, to provide an average which is unaffected by erratic sample weight data. Other methods to filter data include eliminating the two data points in each sample group having the greatest deviation from the average dough piece weight data and to then recalculate the average dough piece weight using the more restrictive sample group data.

As shown in step 210, if the average weight of the dough pieces 23 in the filtered sample group is greater than the target weight, then at step 220, a corrective signal proportional to the deviation from the target weight is sent to the dough divider to reduce the size of the dough piece 23. After the corrective signal is sent to the dough divider 14, the process reverts back to step 110.

Conversely, in step 230, if the average of the sample group is less then the desired piece weight, then at step 240, a corrective signal proportional to the deviation from the target weight is sent to the dough divider to increase the size of the dough piece 23. After the corrective signal is sent to the dough divider, the process reverts back to step 110.

If the sample group average weight is equal to the target weight, then no corrective signal is sent to the dough divider, and the process reverts to step 110.

The weight signal processor 18 compares the weight, of each dough in each group to the desired dough piece weight and automatically calculates a signal which is sent to the controller of the dough divider 14 to increase or decrease the amount of dough passing through the cutting mechanism during each cut cycle, thereby providing continuous divided dough weight monitoring and control.

Finally, it should be emphasized that the above-described embodiments of the present invention, particularly, any “preferred” embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

The invention claimed is:

1. An apparatus for dividing a continuous flow of dough into a plurality of pieces, each piece having a substantially uniform preselected target weight, the apparatus comprising:
- a divider that receives the continuous flow of dough and that divides the dough into pieces sized in proportion to an operating rate that is controlled by electrical operating rate control signals;
- a proofer downstream from the dough divider that receives and transports the dough pieces from the dough divider onto trays at an average speed equal to the divider, each tray having a plurality of cups that hold respective dough pieces, the trays being movable in succession via a conveyor means;
- a checkweigher associated with the proofer that receives and transports the dough pieces via the conveyor means, the checkweigher having:
  - tray tipper designed to tip a selected tray of dough pieces so that the dough pieces of the selected tray fall out of the tray;
  - a plurality of gates situated under the selected tray, each gate designed to receive a respective dough piece, to hold the dough piece for predetermined time period, and to release the dough piece after the predetermined time period so the dough piece falls into the cup from which the dough piece originally resided in the selected tray; and
  - a plurality of load cells associated with respective gates, each load cell configured to produce weight data indicative of a weight of the respective dough piece; and
- a controller in electrical communication with the dough divider and the load cells, the controller designed to receive the weight data from the load cells and to adjust the operating rate control signals that are communicated to the dough divider.

2. The apparatus of claim 1, wherein the controller is a processor is programmed to:
- receive a group of a predetermined number of successive weight indications from the load cells;
- calculate the average weight indication of the group;
- determine whether all of the weight indications in the group fall within a predetermined standard deviation of the average weight indication of the group, and if so,
- calculate the difference between the average weight and the sum of the target weight and the tare weight of the segment of the conveyor;
- when the difference is less than a predetermined tare setpoint, then use the average weight as the tare weight for subsequent weight indications; and
- when the difference is greater than the predetermined tare setpoint, then include the average weight indication of the group in an array of a predetermined number of weight samples, calculate the average of the weight samples in the array and adjust the operating rate control signal according to the difference between the average sample weight and the sum of the preselected target weight and the tare weight.

3. The apparatus of claim 1 wherein each load cell comprises a high precision electromagnetic force coil weigh cell.

4. The apparatus of claim 1, wherein the conveyor means transports the trays in a circuitous path over the gates where the pieces are tipped and fall downwardly to the gates and then under the gates where the pieces are captured after being weighed.

5. The apparatus of claim 1, wherein each gate comprises:
- a housing defining a channel through which the respective dough piece travels;
- opposing first and second grasping members situated adjacent to the channel, each grasping member having a body with upper and lower ends, the upper end being connected to the housing via at least one hinge, the lower end capable of pivoting inwardly into the open channel to an inward position to thereby partially close the channel in order to catch and hold the respective dough piece, the lower end capable of pivoting outwardly from the inward position to an outward position to thereby re-open the channel in order to release the respective dough piece;
- an actuator connected to the grasping members via mechanical linkage so that the actuator can control movement of the lower ends of the grasping members between the inward and outward positions; and
- wherein the controller is in electrical communication with and controls the actuator.

6. The apparatus of claim 1,
- wherein the conveyor means transports the trays in a circuitous path over the gates where the pieces are tipped and fall downwardly to the gates and then under the gates where the pieces are captured after being weighed; and wherein each tray comprises:

a frame with an elongated body extending between first and second ends;

a row of cups supported by the frame between the first and second ends, a concave surface of each cup facing upwardly and designed to hold a respective dough piece;

first and second semicircular end bars extending upwardly from the first and second ends, respectively, each end bar being pivotally connected to the conveyor means so that the frame remains in a posture where the cups remain with the concave surface facing upwardly as the tray is moved along a circuitous path by the conveyor means.

7. The apparatus of claim 6, wherein the conveyor means is at least one conveyor having first and second chains connected to the first and second ends of the frame of the tray and that move the tray in the same direction.

8. An apparatus for dividing a continuous flow of dough into a plurality of pieces, each piece having a substantially uniform preselected target weight, the apparatus comprising:

means for receiving a continuous flow of dough and dividing the dough into pieces sized in proportion to an operating rate;

means for placing the dough pieces in trays, each tray having a plurality of cups that hold respective dough pieces;

means for moving the trays in succession along a circuitous path;

means for tipping a selected tray of dough pieces so that the dough pieces of the selected tray fall out of the tray;

means for receiving and holding the dough pieces after they fall out of the tray, measuring weights associated with each dough piece while being held, and releasing the dough pieces so the dough pieces fall into the cups from which the dough pieces originally resided in the selected tray; and means for adjusting the operating rate based upon the weights.

9. The apparatus of claim 8, wherein the adjusting means is a controller designed to:

receive a group of a predetermined number of successive weight indications;

calculate the average weight indication of the group;

determine whether all of the weight indications in the group fall within a predetermined standard deviation of the average weight indication of the group, and if so, calculate the difference between the average weight and the sum of the target weight and the tare weight of the segment of the conveyor;

if the difference is less than a predetermined tare setpoint, then use the average weight as the tare weight for subsequent weight indications; and if the difference is greater than the predetermined tare setpoint, then include the average weight indication of the group in an array of a predetermined number of weight samples, calculate the average of the weight samples in the array and adjust the operating rate control signal according to the difference between the average sample weight and the sum of the preselected target weight and the tare weight.

10. The apparatus of claim 8, wherein the moving means transports the trays in a circuitous path over the gates where the pieces are tipped and fall downwardly to the gates and then under the gates where the pieces are captured after being weighed.

11. The apparatus of claim 8, wherein the receiving and holding means is a plurality of gates, each gate comprising:

a housing defining a channel through which the respective dough piece travels;

opposing first and second grasping members situated adjacent to the channel, each grasping member having a body with upper and lower ends, the upper end being connected to the housing via at least one hinge, the lower end capable of pivoting inwardly into the open channel to an inward position to thereby partially close the channel in order to catch and hold the respective dough piece, the lower end capable of pivoting outwardly from the inward position to an outward position to thereby re-open the channel in order to release the respective dough piece;

an actuator connected to the grasping members via mechanical linkage so that the actuator can control movement of the lower ends of the grasping members between the inward and outward positions.

12. The apparatus of claim 8, wherein the receiving and holding means is a plurality of gates, wherein the moving means transports the trays in a circuitous path over the gates where the pieces are tipped and fall downwardly to the gates and then under the gates where the pieces are captured after being weighed; and wherein each tray comprises:

a frame with an elongated body extending between first and second ends;

a row of cups supported by the frame between the first and second ends, a concave surface of each cup facing upwardly and designed to hold a respective dough piece;

first and second semicircular end bars extending upwardly from the first and second ends, respectively, each end bar being pivotally connected to the conveyor means so that the frame remains in a posture where the cups remain with the concave surface facing upwardly as the tray is moved along a circuitous path by the moving means.

13. The apparatus of claim 8, wherein the conveyor means is at least one conveyor having first and second chains connected to the first and second ends of the frame of the tray and that move the tray in the same direction.

14. A proofer that can receive dough pieces from a dough divider onto trays at an average speed equal to the dough divider, each tray having a plurality of cups that hold respective dough pieces, the trays being movable in succession through the intermediate proofer via a conveyor system, the proofer comprising:

(a) a checkweigher associated with the proofer that receives and transports the dough pieces via the conveyor system of the proofer, the checkweigher comprising:

(1) tray tipper designed to tip a selected tray of dough pieces so that the dough pieces of the selected tray fall out of the tray;

(2) a plurality of gates situated under the selected tray, each gate designed to receive a respective dough piece, to hold the dough piece for predetermined time period, and to release the dough piece after the predetermined time period so the dough piece falls into the cup from which the dough piece originally resided in the selected tray; and (3) a plurality of load cells associated with respective gates, each load cell configured to produce weight data indicative of a weight of the respective dough piece; and (4) a controller capable of controlling the dough divider based upon the weight data so that the dough pieces exhibit a substantially uniform preselected target weight.

15. The proofer of claim 14, wherein the conveyor system transports the trays in a circuitous path over the gates where the pieces fall downwardly to the gates and then under the gates where the pieces are captured after being weighed.

16. The apparatus of claim 14, wherein each gate comprises:

a housing defining a channel through which the respective dough piece travels;

opposing first and second grasping members situated adjacent to the channel, each grasping member having a body with upper and lower ends, the upper end being connected to the housing via at least one hinge, the lower end capable of pivoting inwardly into the open channel to an inward position to thereby partially close the channel in order to catch and hold the respective dough piece, the lower end capable of pivoting outwardly from the inward position to an outward position to thereby re-open the channel in order to release the respective dough piece;

an actuator connected to the grasping members via mechanical linkage so that the actuator can control movement of the lower ends of the grasping members between the inward and outward positions; and wherein the controller is in electrical communication with and controls the actuator.

17. The apparatus of claim 14, wherein the conveyor system transports the trays in a circuitous path over the gates where the pieces are tipped and fall downwardly to the gates and then under the gates where the pieces are captured after being weighed; and wherein each tray comprises:

a frame with an elongated body extending between first and second ends;

a row of cups supported by the frame between the first and second ends, a concave surface of each cup facing upwardly and designed to hold a respective dough piece;

first and second semicircular end bars extending upwardly from the first and second ends, respectively, each end bar being pivotally connected to the conveyor means so that the frame remains in a posture where the cups remain with the concave surface facing upwardly as the tray is moved along a circuitous path by the conveyor means.

18. The apparatus of claim 14, wherein the conveyor system is at least one conveyor having first and second chains connected to the first and second ends of the frame of the tray and that move the tray in the same direction.

19. A method for dividing a continuous flow of dough into a plurality of pieces, each piece having a substantially uniform preselected target weight, the method comprising the steps of:

receiving a continuous flow of dough and dividing the dough into pieces sized in proportion to an operating rate;

placing the dough pieces in trays, each tray having a plurality of cups that hold respective dough pieces;

moving the trays in succession along a circuitous path;

tipping a selected tray of dough pieces so that the dough pieces of the selected tray fall out of the tray;

receiving and holding the dough pieces, measuring weights associated with each dough piece while being held, and releasing the dough pieces so the dough pieces fall into the cups from which the dough pieces originally resided in the selected tray; and adjusting the operating rate based upon the weights.

20. The method of claim 19, further comprising the steps of:

receiving a group of a predetermined number of successive weight indications from the load cells;

calculating the average weight indication of the group;

determining whether all of the weight indications in the group fall within a predetermined standard deviation of the average weight indication of the group, and if so, calculating the difference between the average weight and the sum of the target weight and the tare weight of the segment of the conveyor;

when the difference is less than a predetermined tare setpoint, then using the average weight as the tare weight for subsequent weight indications; and when the difference is greater than the predetermined tare setpoint, then including the average weight indication of the group in an array of a predetermined number of weight samples, calculate the average of the weight samples in the array and adjust the operating rate control signal according to the difference between the average sample weight and the sum of the preselected target weight and the tare weight.

* * * * *